UNITED STATES PATENT OFFICE.

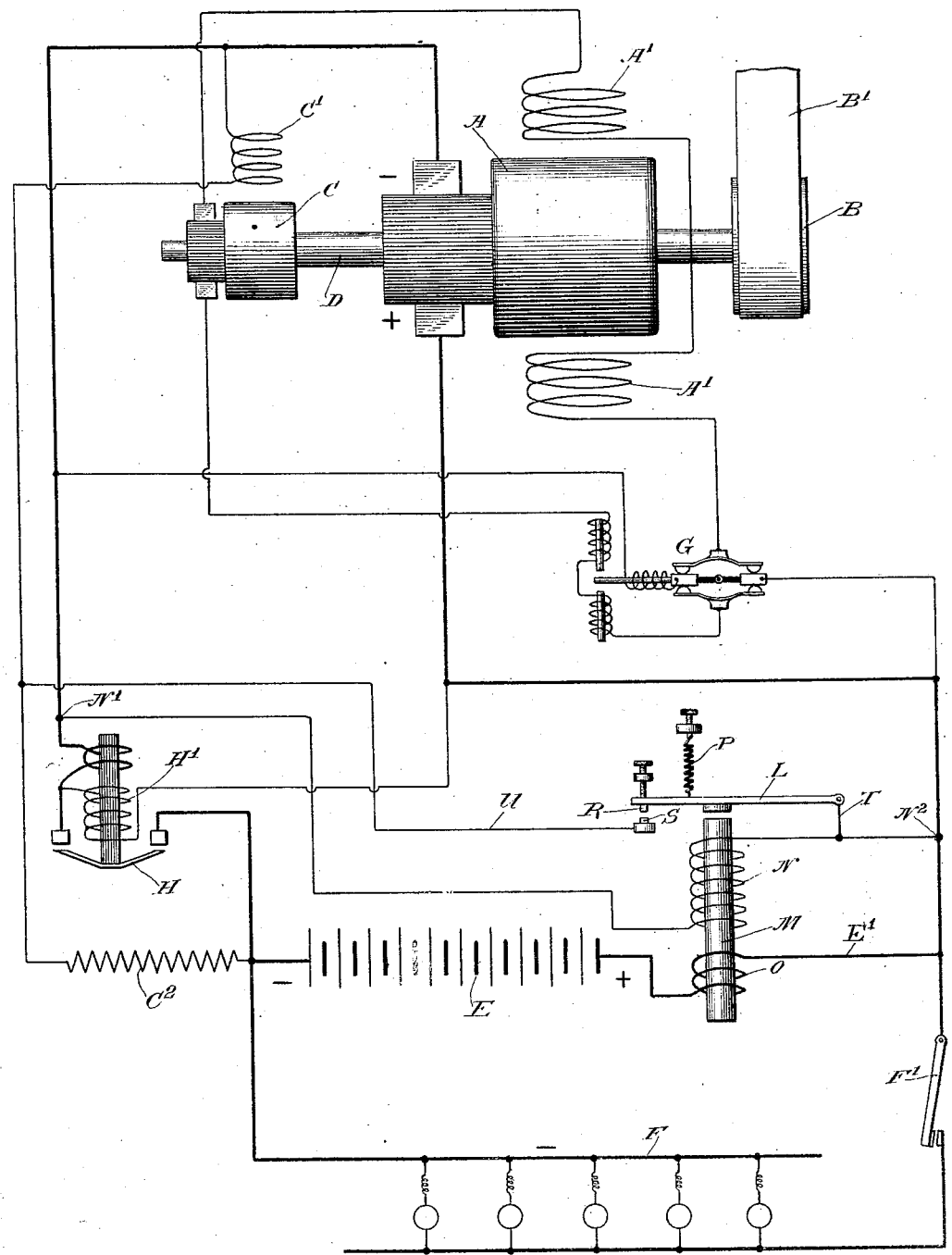

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

991,110.  Specification of Letters Patent.  Patented May 2, 1911.

Application filed January 27, 1909. Serial No. 474,453.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and is more especially devised with relation to car lighting systems in which the main dynamo is driven from the car axle and in which automatic means are employed to properly regulate the voltage of the main generator. My invention is not, however, limited to such systems but may be found applicable to many other arrangements.

A number of features which I shall show and describe and with which my invention may be employed, have been shown and described in a previous application of mine, Serial No. 430,461, filed May 2nd, 1908.

One particular object of my present invention is to provide an economical and efficient means for causing the proper regulation of the main generator in such systems.

My improvements further provide for an efficient regulation which is responsive to the voltage changes of the main generator itself or of the system.

My invention further provides for means for regulating the charging current of the battery in such systems in such a manner as to cause the generator to produce a tapering charging current therefor.

In carrying out my invention I preferably regulate the main generator by means of an auxiliary dynamo connected in the field circuit thereof, the field of which auxiliary dynamo is controlled by means of an automatic switch acted upon by a solenoid responsive to voltage variations of the system. The action of the solenoid is further varied responsive to fluctuations of current in the battery circuit.

Further objects, features and advantages will more clearly appear from the detailed description given below taken in connection with the accompanying drawing which diagrammatically shows a system embodying one form of my invention.

In the drawing, A indicates the main dynamo and A' the field windings thereof. The dynamo is indicated as being driven by pulley B and belt B' from any suitable source of power, as for example, the axle of a railway car.

C represents an auxiliary or regulating dynamo which is mechanically connected to the main generator or dynamo A by the shaft D, and therefore, rotates in the same direction as the main dynamo.

C' represents the field windings of the auxiliary dynamo.

E represents a storage battery and E' its circuit which is operatively arranged with respect to the main generator A.

F represents a work circuit which is also operatively arranged with respect to the main dynamo A to be supplied thereby, a switch F' being connected in circuit therewith in order to cut out the translating devices of the work circuit when desired. In the present instance the translating devices of the work circuit consist of a number of lamps with a regulating resistance in the circuit of each.

G is a switch that controls the connection of the field winding A' of the main dynamo in such a manner that this field winding is connected so that the main generator produces an electro-motive force always in the same direction regardless of the direction of rotation. The operation of the switch G is not new with this application and forms no part of the present invention. It is fully described in my previous application, Serial No. 430,461, above mentioned.

Various parts of the system are shown in the positions they occupy when the system is about to be started up. The switch H is open and the work circuit will be fed by the battery upon the closing of the switch F'. The coil C' of the auxiliary dynamo or generator is energized from the battery, the terminals of the coil being connected across the battery through the armature of the generator A and resistance $C^2$. The resistance $C^2$ is inserted to cut down the value of the exciting current in the coil C' when the machines are being started up and to prevent the battery being short-circuited upon the operation of the switching device or armature L. When the machines are being started up the coil C' furnishes the initial excitation for the auxiliary dynamo C. It is only necessary that a very small excitation be provided by the coil C' to cause the machines to properly build up, and the resistance $C^2$ prevents a needless waste of current for this purpose. When the generators are at rest the lamps or other load at F are fed by the battery and the switch H is open to prevent a reverse current from the battery through the main generator A. The field coil C' being provided with a weak current from the battery, as above explained, when the generators are started up the auxiliary machine C, excited by the coil C', will produce an exciting current in the field windings A' in such a direction as to always maintain the same brush of the main generator, positive. This current also operates the switching device or pole changer G to properly connect the field windings A' across the armature of generator A and in series with the machine C to maintain this condition of polarity. Upon the operation of the pole changer G the machine will build up independently of the generator C, although it may be aided somewhat thereby.

When the electro-motive force of the main generator has reached its normal value the switch H is closed by the action of the voltage coil H'. This connects the work circuit and battery with the main generator so that the work circuit will receive its current therefrom, the voltage of the generator being sufficient to also cause the battery to be charged therefrom. At the same time the coil C' is short-circuited so that it has practically no effect as an exciting element. The generator A will continue operating as a simple shunt machine and when the speed thereof is increased its voltage will rise until checked by the regulating apparatus now to be described.

M represents the core of an electro-magnet or solenoid which is energized by two coils, one a coil N connected directly across the mains of the system at the points N' and $N^2$, so that it will always be responsive to voltage variations of the generator; the other, coil O, which aids the action of the coil N and is connected in series in the battery circuit E'. L represents an armature of the solenoid M which is normally retracted by means of the spring P. The armature L carries a contact R adapted to make electrical connection with a fixed contact S. The armature L is electrically connected with the positive side of the generator by means of conductor T and the contact terminal S is electrically connected with the circuit in which is the coil C', between the coil C' and the resistance $C^2$, by means of conductor $u$.

When the voltage of the main generator of the system rises above a predetermined value determined by the condition of the spring P, the strength of the coil N will be sufficient to cause the solenoid to attract the armature L and thereby connect the field coil C' of the auxiliary dynamo C directly across the main circuit. This energizes the coil C' in an opposite direction from that in which it was energized initially by the battery. This causes the dynamo C to act as a counter-machine or as an opposing source of electro-motive force in series with the field windings A', which cuts down their action so as to bring the voltage of the generator back to the said predetermined value. Immediately the voltage has dropped to the predetermined value the spring P will cause the armature L to be retracted whereupon the voltage will tend to rise again. However, upon a very slight rise of voltage again the armature L is attracted by the solenoid so that the voltage is again reduced. These actions will be repeated periodically and by adjustment of the spring P the generator may be held at substantially any desired voltage whether the translating devices be in circuit or not. Since the coil C' is shunted by resistance $C^2$ the magnetizing current through the coil C' will rise and fall gradually, so that the voltage of the generator A will be held substantially steady, and, furthermore the contacts R and S will not be subjected to harmful sparking.

The series coil O in the battery circuit E' acts to aid the voltage coil N, and therefore, tends to cause a reduction of the generator voltage. The coil O may be so designed that any desired initial rate of charge may be given the battery. As the voltage of the battery rises due to its becoming charged the current in the coil O will tend to decrease, thereby decreasing the strength of the solenoid so that the voltage of the main generator A will be slightly increased. This tends to cause the generator to bring the battery charging current back to its normal value but in order to do this the voltage of the main generator must be slightly increased, which in turn increases the effect of the coil N. This increase in the effect of the coil N, therefore, causes a less current to flow in the battery circuit and upon further charging the battery, the battery charging current in the circuit E' is gradually decreased thus producing a tapering charging current for the battery.

By my improvements only a very small current is required in the regulating field coil C' since its action upon the regulation of the main generator A is greatly magnified because of the dynamo C. A very small current is, therefore, only required in the circuit $u$, so that sparking is even more decreased between the contacts R and S. Further, the arrangement acts automatically and inherently to cause the generator to produce the proper tapering charging current for the battery. From the above it will be apparent that the system shown and described is economical and effective in operation and construction, as it has few parts liable to get out of order, and is very efficient.

Although I have described my improvements in great detail I do not desire to be limited by such details but Having fully and clearly described the same what I claim as new and desire to secure by Letters Patent is:

1. In an electrical car lighting system, a generator adapted to be driven from the car axle, a work circuit supplied thereby, a storage battery and its circuit in operative relation thereto, an auxiliary dynamo mechanically connected with the generator and connected in series with the field of the generator, a main switch between the generator and storage battery, a field coil for the dynamo connected to be fed from the battery to aid the generator to build up when starting, a vibrating armature for connecting said field coil across the generator to cause the dynamo to act as a counter-machine upon the closing of the main switch, a magnet for operating said armature, said magnet being provided with a coil connected across the generator to limit the voltage thereof and a coil in the battery circuit to limit the charging current thereof.

2. In an electrical car lighting system, a generator driven at a variable speed, a work circuit supplied thereby, a storage battery and its circuit in operative relation thereto, an auxiliary dynamo mechanically connected with the generator and connected in series with the field of the generator, a main switch between the generator and storage battery, a field coil for the dynamo connected to be fed from the battery to aid the generator to build up when starting, a vibrating armature for connecting said coil across the generator to cause the dynamo to act as a counter-machine and a magnet for controlling the periodicity of vibrations of said armature responsive to variations in voltage of the system.

3. In an electrical car lighting system, a main generator driven at variable speeds, a work circuit and storage battery fed thereby, a regulating dynamo for the generator, a field coil for the dynamo connected to be fed from the battery to aid the generator in building up, a vibrating armature for connecting said field coil across the generator to cause the dynamo to act as a counter-machine and a magnet for controlling the periodicity of vibrations of said armature responsive to voltage fluctuations of the system.

4. In an electrical car lighting system, a main shunt wound generator driven at a variable speed as by the movement of the car, a work circuit and storage battery fed by the generator, a regulating device in series with generator shunt field and provided with a controlling coil, a vibrating armature for connecting said coil to be supplied by the periodicity of vibrations of said armature, said magnet having a coil connected across the generator.

5. In an electrical car lighting system, a main generator driven at a variable speed as by the movement of the car, a work circuit and storage battery fed by the generator, a regulating device for controlling the generator field strength and provided with a controlling coil, a vibrating armature for connecting said coil to be supplied by the generator, and a magnet for controlling the periodicity of vibrations of said armature, said magnet being connected responsive to voltage changes of the system.

6. In an electrical car lighting system, a main shunt wound generator driven at a variable speed as by the movement of the car, a work circuit and storage battery fed by the generator, a regulating device opposing the shunt field of the generator and provided with a controlling coil, a vibrating armature for connecting said coil to be supplied by the generator, and a magnet for controlling the periodicity of vibrations of said armature, said magnet being connected responsive to voltage changes of the system.

In testimony whereof, I have signed my name to this specification, in the presence of two subscribing witnesses.

WILLIAM A. TURBAYNE.

Witnesses:
RAYMOND HUMMELL,
W. H. PATTENDEN.

Copies of this patent may be obtained for five cents each, by addressing the "Commissioner of Patents, Washington, D. C."

It is hereby certified that in Letters Patent No. 991,110, granted May 2, 1911, upon the application of William A. Turbayne, of Lancaster, New York, for an improvement in "Electrical Systems of Distribution," an error appears in the printed specification requiring correction as follows: Page 3, after line 64, insert the words *generator, and a magnet for controlling the*; and that the said Letters Patent should be read with this correction therein that the same may conform to the record of the case in the Patent Office.

Signed and sealed this 28th day of November, A. D., 1911.

[SEAL.]

E. B. MOORE,
*Commissioner of Patents.*